US012047012B2

(12) United States Patent
Mondal (10) Patent No.: US 12,047,012 B2
(45) Date of Patent: Jul. 23, 2024

(54) SYSTEMS AND METHODS FOR ISOLATED LOW VOLTAGE ENERGY STORAGE FOR DATA CENTERS

(71) Applicant: Inertech IP LLC, Plano, TX (US)

(72) Inventor: Subrata K. Mondal, South Windsor, CT (US)

(73) Assignee: INERTECH IP LLC, Plano, TX (US)

( * ) Notice: Subject to any disclaimer, the term of this patent is extended or adjusted under 35 U.S.C. 154(b) by 0 days.

(21) Appl. No.: 17/893,662

(22) Filed: Aug. 23, 2022

(65) Prior Publication Data
US 2023/0091202 A1 Mar. 23, 2023

Related U.S. Application Data

(63) Continuation of application No. 16/890,856, filed on Jun. 2, 2020, now Pat. No. 11,424,677, which is a (Continued)

(51) Int. Cl.
*H02J 7/00* (2006.01)
*H02J 9/00* (2006.01)
*H02J 9/06* (2006.01)
*H02M 1/04* (2006.01)
*H02M 1/08* (2006.01)
(Continued)

(52) U.S. Cl.
CPC ......... *H02M 7/4837* (2021.05); *H02J 7/0063* (2013.01); *H02J 9/00* (2013.01); *H02J 9/062* (2013.01); *H02M 1/04* (2013.01); *H02M 1/083* (2013.01); *H02M 3/155* (2013.01); *H02M 3/158* (2013.01); *H02M 3/33584* (2013.01); *H02M 7/487* (2013.01); *H02M 7/527* (2013.01); *H02M 1/0058* (2021.05); *H02M 1/0064* (2021.05); *H02M 1/007* (2021.05);
(Continued)

(58) Field of Classification Search
CPC ....................................................... H02J 7/00
See application file for complete search history.

(56) References Cited

U.S. PATENT DOCUMENTS

| | | | |
|---|---|---|---|
| 2015/0365003 A1* | 12/2015 | Sadwick | H02M 3/28 363/21.01 |
| 2016/0204654 A1* | 7/2016 | Mondal | H02J 7/0068 307/67 |
| 2016/0233776 A1* | 8/2016 | Nielsen | H02M 3/33584 |

* cited by examiner

*Primary Examiner* — Robert Grant
(74) *Attorney, Agent, or Firm* — Weber Rosselli & Cannon LLP (57) ABSTRACT

Systems and methods of this disclosure use low voltage energy storage devices to supply power at a medium voltage from an uninterruptible power supply (UPS) to a data center load. The UPS includes a low voltage energy storage device (ultracapacitor/battery), a high frequency (HF) bidirectional DC-DC converter, and a multi-level (ML) inverter. The HF DC-DC converter uses a plurality of HF planar transformers, multiple H-bridge circuits, and gate drivers for driving IGBT devices to generate a medium DC voltage from the ultracapacitor/battery energy storage. The gate drivers are controlled by a zero voltage switching (ZVS) controller, which introduces a phase shift between the voltage on the primary and secondary sides of the transformers. When the primary side leads the secondary side, the ultracapacitor/battery discharges and causes the UPS to supply power to the data center, and when the secondary side leads the primary side, power flows from the grid back to the UPS, thereby recharging the ultracapacitor/battery.

20 Claims, 11 Drawing Sheets

Related U.S. Application Data continuation of application No. 15/853,704, filed on Dec. 22, 2017, now Pat. No. 10,673,327.

(60) Provisional application No. 62/438,147, filed on Dec. 22, 2016.

(51) Int. Cl.
| | |
|---|---|
| *H02M 3/155* | (2006.01) |
| *H02M 3/158* | (2006.01) |
| *H02M 3/335* | (2006.01) |
| *H02M 7/483* | (2007.01) |
| *H02M 7/487* | (2007.01) |
| *H02M 7/527* | (2006.01) |
| *H02M 1/00* | (2006.01) |

(52) U.S. Cl.
CPC ........ *H02M 1/0077* (2021.05); *H02M 3/1582* (2013.01); *Y02B 70/10* (2013.01)

SYSTEMS AND METHODS FOR ISOLATED LOW VOLTAGE ENERGY STORAGE FOR DATA CENTERS

BACKGROUND

1. Technical Field

This disclosure generally relates to the application of low-voltage battery energy storage to data centers using multi-level medium voltage uninterrupted power supplies (MVUPSs) and data center static synchronous compensators (DCSTATCOMs), and more particularly, to a bi-directional, high frequency direct current (DC)-DC converter with isolation at the output of energy storage devices.

2. Background of Related Art

Data centers are among the largest and fastest growing consumers of electricity in the world. In 2013, U.S.-based data centers consumed an estimated 91 billion kWhr of electricity, which is about enough electricity to power all the households in New York City twice over, and they are on track to reach 140 billion kWhr by 2020. Meanwhile, computer equipment manufacturers continue to expand the data collection and storage capabilities of their servers, which are widely used in data centers globally. This expansion has led to an increase in the total power requirements of data centers; both while connected to an electrical utility and also during interruptions in power from the electrical utility. In particular, data centers now demand power in the megawatt range and voltage in the medium voltage kV range. Also, medium voltage (MV) operation reduces overall electrical losses and reduces power usage effectiveness (PUE) of data centers. As a result, data centers require uninterruptible power supplies ("UPS") that can meet high power and high/medium voltage requirements when there is a short interruption in the power supplied from the electrical utility. In the case of long interruptions of power, a generator typically takes over the function of supplying power to the data center.

SUMMARY

According to one aspect, this disclosure is directed to a power source. The power source includes DC-DC converter circuits coupled together. Each DC-DC converter circuit includes a low voltage energy storage device, a first H-bridge circuit coupled to the low voltage energy storage device, a high frequency transformer, and a second H-bridge circuit. A primary side of the high frequency transformer is coupled to the first H-bridge circuit and a secondary side of the high frequency transformer is coupled to the second H-bridge circuit.

In some embodiments, the power source may include first switching device drivers coupled to the first H-bridge circuit, second switching device drivers coupled to the second H-bridge circuit, and a controller coupled to the first switching device drivers and the second switching device drivers, the controller configured to control the first switching device drivers and the second switching device drivers to charge or discharge the low voltage energy storage device, by controlling a phase shift between a first drive signal output from the first switching device drivers and a second drive signal output from the second switching device drivers.

In certain embodiments, the controller is a phase-shifted zero voltage switching (ZVS) controller. In certain embodiments, the ZVS controller controls the switching device drivers to charge or discharge the energy storage device. In embodiments, the ZVS controller is a programmable logic controller which generates phase-shifted fixed frequency (e.g., 10 to 15 kHz) 50% duty ratio ON-OFF switching signals.

In some embodiments, the first H-bridge circuit includes first switching devices coupled to respective first switching device drivers and the second H-bridge circuit includes second switching devices coupled to respective second switching device drivers.

In certain embodiments, the first switching devices and the second switching devices are insulated-gate bipolar transistor (IGBT) devices, or metal-oxide-semiconductor field-effect transistor (MOSFET) devices.

In some embodiments, a snubbing capacitor is disposed across each IGBT device. In embodiments, the high frequency transformer of each of the DC-DC converters is a planar transformer. In certain embodiments, the first H-bridge circuit, the second H-bridge circuit, and the high frequency transformer are combined into a modular circuit.

In certain embodiments, outputs of the first H-bridge circuits are coupled together in series to provide a high DC voltage output. In certain embodiments, the low voltage energy storage device is an ultracapacitor, a lead-acid battery, a lithium-ion battery, or any combination of these energy storage devices.

According to another aspect, this disclosure is directed to an uninterruptible power supply. The uninterruptible power supply includes DC-DC converters, which include respective outputs coupled together in series and a multi-level (ML) inverter coupled across the DC-DC converters. Each DC-DC converter includes a low voltage energy storage device, a first H-bridge circuit coupled to the low voltage energy storage device, a high frequency transformer having a primary side coupled to the first H-bridge, and a second H-bridge circuit coupled to a secondary side of the high frequency transformer.

In certain embodiments, a space vector pulse width modulation (SVPWM) controller controls the ML inverter. In certain embodiments, the high frequency transformer of each of the DC-DC converters is a planar transformer. In embodiments, the first H-bridge circuit, the second H-bridge circuit, and the high frequency transformer are combined into a modular circuit. In some embodiments, outputs of the first H-bridge circuits are coupled together in series to provide a high DC voltage output.

In certain embodiments, the low voltage energy storage device is an ultracapacitor, a lead-acid battery, a lithium-ion battery, or any combination of these energy storage devices. In certain embodiments, a battery management system (BMS) controller is coupled to the low voltage energy storage device.

In accordance with another aspect of this disclosure, there is provided a method including supplying low voltage power signals from respective low voltage energy storage devices, generating first PWM signals to drive first H-bridge circuits coupled to the respective low voltage energy storage devices, stepping up voltages output from each of the first H-bridge circuits using a high frequency transformer, generating second PWM signals to drive second H-bridge circuits so that the second PWM signals are out of phase from the first PWM signals to charge the low voltage energy storage devices from an external power source or to discharge the low-voltage energy storage devices to a data center load, and selectively coupling the outputs of the second H-bridge circuits in series to output a second voltage signal having a higher voltage than the voltage of each of the plurality of low voltage energy storage devices.

Other aspects, features, and advantages will be apparent from the description, the drawings, and the claims that follow.

DETAILED DESCRIPTION

Figure 1:
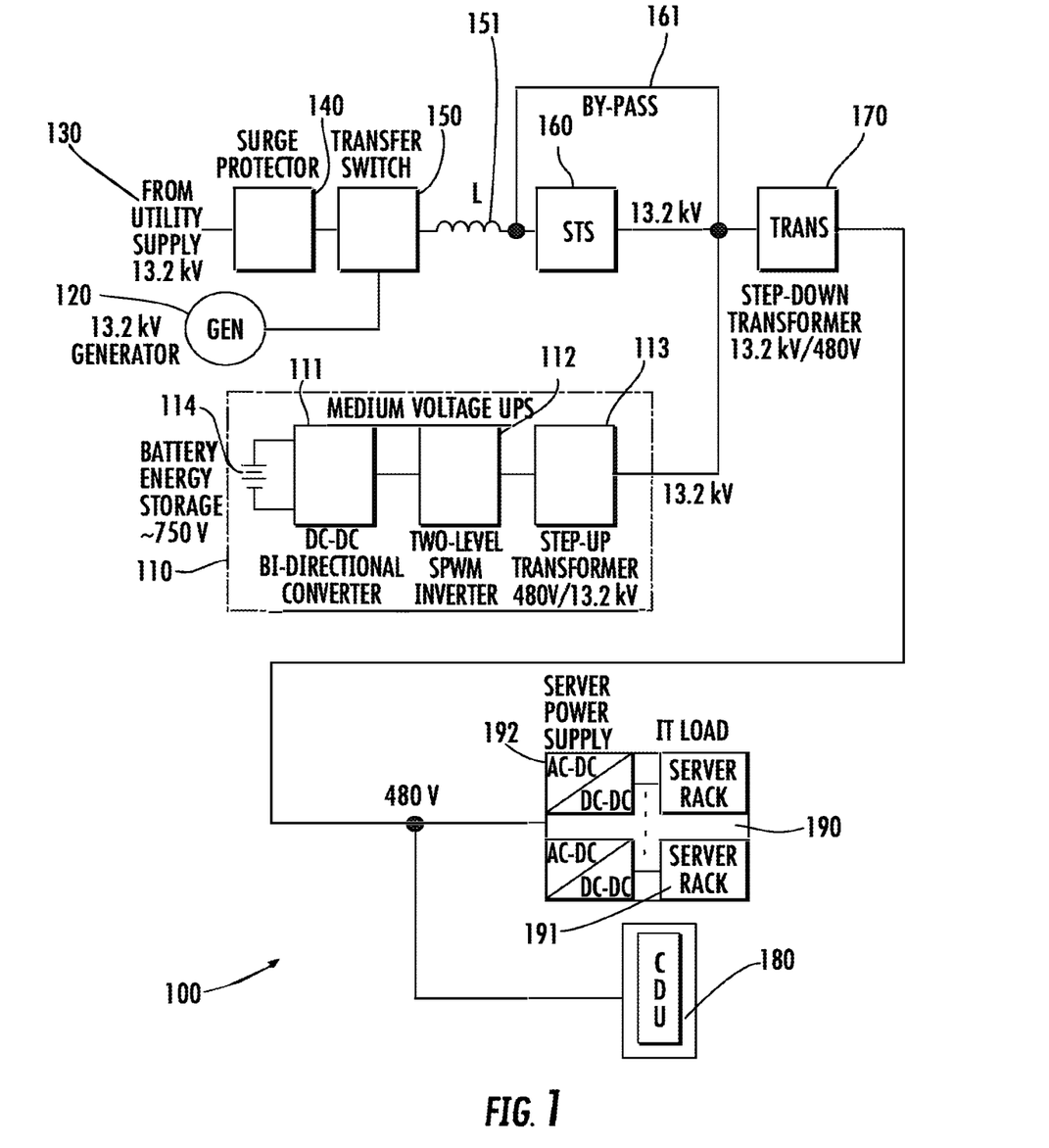
FIG. 1 is a block diagram of a MV data center topology including a MV generator and an LV UPS with a step-up transformer and battery energy storage.

FIG. 1 shows an existing system 100 for supplying power to an information technology (IT) load 190 and/or a mechanical load. The system includes a utility supply 130, a generator 120, and an uninterruptible power supply (UPS) 110 that includes a step-up transformer 113 for medium voltage application. Under normal load conditions, power is supplied to the IT load 190 entirely via the utility supply 130. The utility supply 130 supplies an alternating current (AC) voltage, which, for example, ranges from 3.3 kV to 13.2 kV. The IT load 190 includes multiple server racks 191 and multiple server power supplies 192 that supply power to the multiple server racks 191. The mechanical load includes a coolant distribution unit (CDU) 180, which is used to remove waste heat generated by the IT load 190.

A surge protector 140 limits voltage spikes in the power supplied by the utility supply 130. A line filter 151 is coupled to the AC line between the transfer switch 150 and the static transfer switch (STS) 160 to reduce harmonics in the power supplied by the generator 120 or the utility supply 130. A bypass line 161 allows maintenance tasks or other work to be performed on the system when an ON/OFF switch (not shown) of bypass line 161 is closed and the static transfer switch (STS) 160 is opened. The STS 160 supplies power to a step-down transformer 170 when the STS 160 is closed. The step-down transformer 170 converts the medium voltage supplied by the utility supply 130, e.g., 13.2 kV, to a low voltage, e.g., 480 V. The low voltage is then supplied to the CDU 180 and the IT load 190 having an appropriate current and voltage level.

When an interruption or disturbance in the power supplied by the utility supply 130 is detected, the STS 160 opens and the MVUPS system 110 starts supplying 100% or about 100% of the power to the CDU 180 and/or the IT load 190 via the UPS's step-up transformer 113. The UPS system 110 can supply power to the CDU 180 and/or the IT load 190 for a short period, e.g., approximately two to five minutes, depending on the amp-hour storage capacity of the energy storage devices 114, but generally the generator starts generating power if the interruption is more than a few seconds.

The UPS system 110 generates power from a low-voltage (e.g., about 750 V DC) energy storage devices 114. The low-voltage battery energy storage devices 114 may include one or more lead-acid or lithium-ion battery packs coupled together in series and/or parallel combination. The DC voltage of the energy storage devices 114 is converted to a low AC voltage (e.g., 480 V) using a two-level inverter 112. The AC voltage output from two-level inverter 112 passes through a filter (not shown), such as an inductor-capacitor (LC) filter, to a step-up transformer 113. The step-up transformer 113 converts the low AC voltage to a medium AC voltage (e.g., 13.2 kV). The medium AC voltage output from the step-up transformer 113 is then provided to the step-down transformer 170, which converts the medium AC voltage to a low AC voltage (e.g., 480 V) appropriate for the CDU 180 and/or the IT load 190.

Once the generator 120 reaches its reference or desired speed and stabilizes, transfer switch 150 shifts the primary power source from the utility supply 130 to the generator 120. During this shift, the output voltage of the UPS system 110 is synchronized to be in phase with the output voltage of the generator 120. Once the STS 160 is closed, a soft transfer from the UPS system 110 to the generator 120 is executed until the CDU 180 and/or the IT load 190 is entirely powered by the generator 120. The energy storage device 114 of the UPS system 110 is then recharged by the power generated by the generator 120.

After the power interruption or disturbance ends, the load is shifted from the generator 120 to the UPS system 110 because the utility supply 130 may be out of phase with the generator 120 and the STS 160 shifts the primary power source to the utility supply 130. The output voltage of the UPS system 110 is then synchronized to be in phase with the output voltage of the utility supply 130. Once the output voltage of the UPS system 110 and utility supply 130 are synchronized, the load is quickly transferred from the UPS system 110 to the utility supply 130. Thereafter, the energy storage devices 114 of the UPS system 110 are recharged from the utility supply 130 so that the UPS system 110 is ready for future interruptions or disturbances in the utility supply 130.

Figure 2:
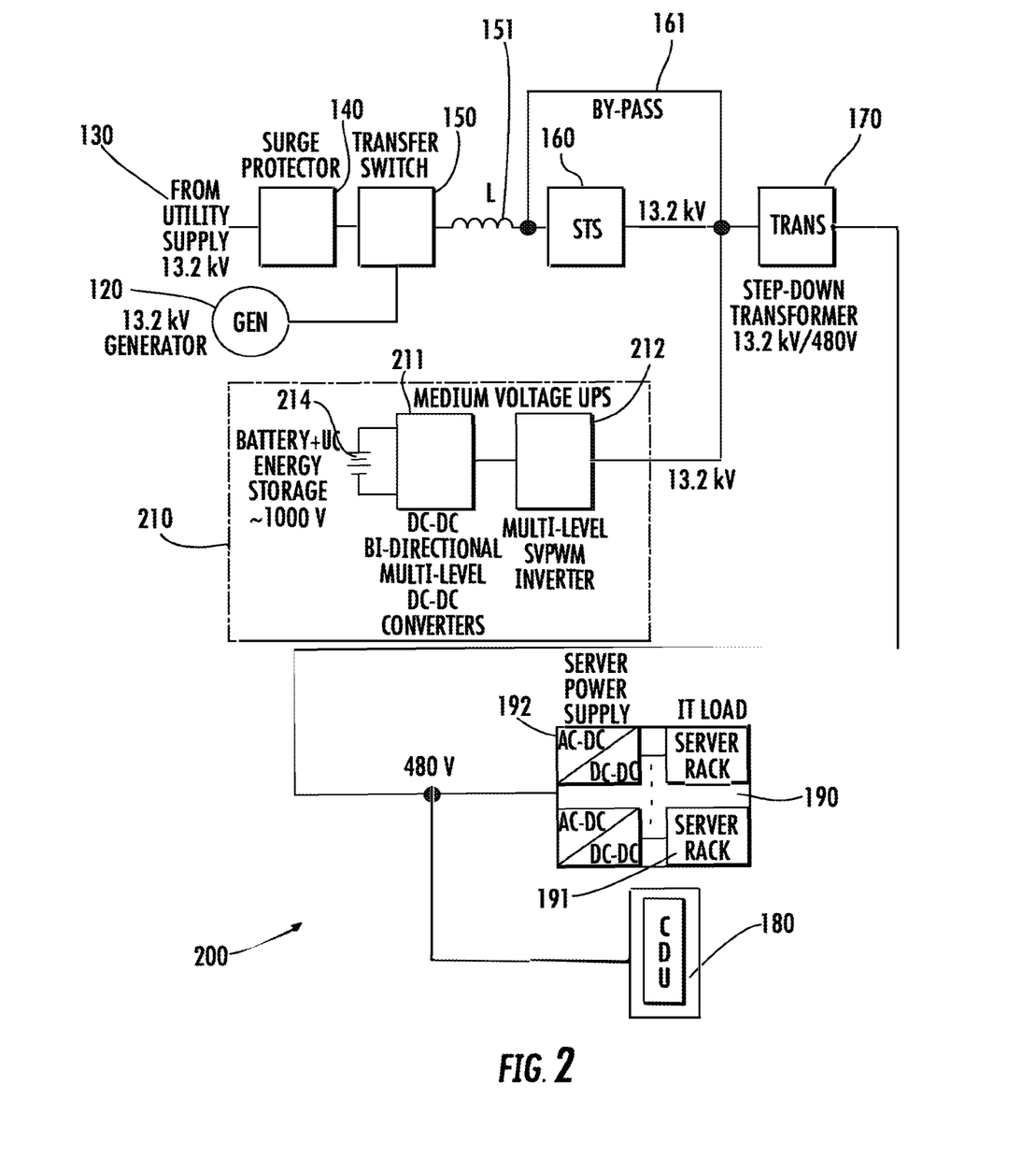
FIG. 2 is a block diagram of a MV data center topology with MV generator and multi-level MVUPS without a step-up transformer and battery and ultracapacitor (UC) energy storage.

FIG. 2 illustrates a medium voltage uninterruptible power supply (MVUPS) 210 with a multi-level inverter section 212 to generate MV for supplying power to the CDU 180 and/or the IT load 190. This topology does not need any step-up transformer at the output of the UPS 210, as the multi-level inverter section 212 generates MV directly, to operate at a medium voltage level (e.g., 13.2 kV). The MVUPS 210 includes three sub-systems: an energy storage section 214, which includes batteries and ultracapacitors, a bi-directional multi-level DC-DC converter section 211, and the multi-level inverter section 212.

Figure 3:
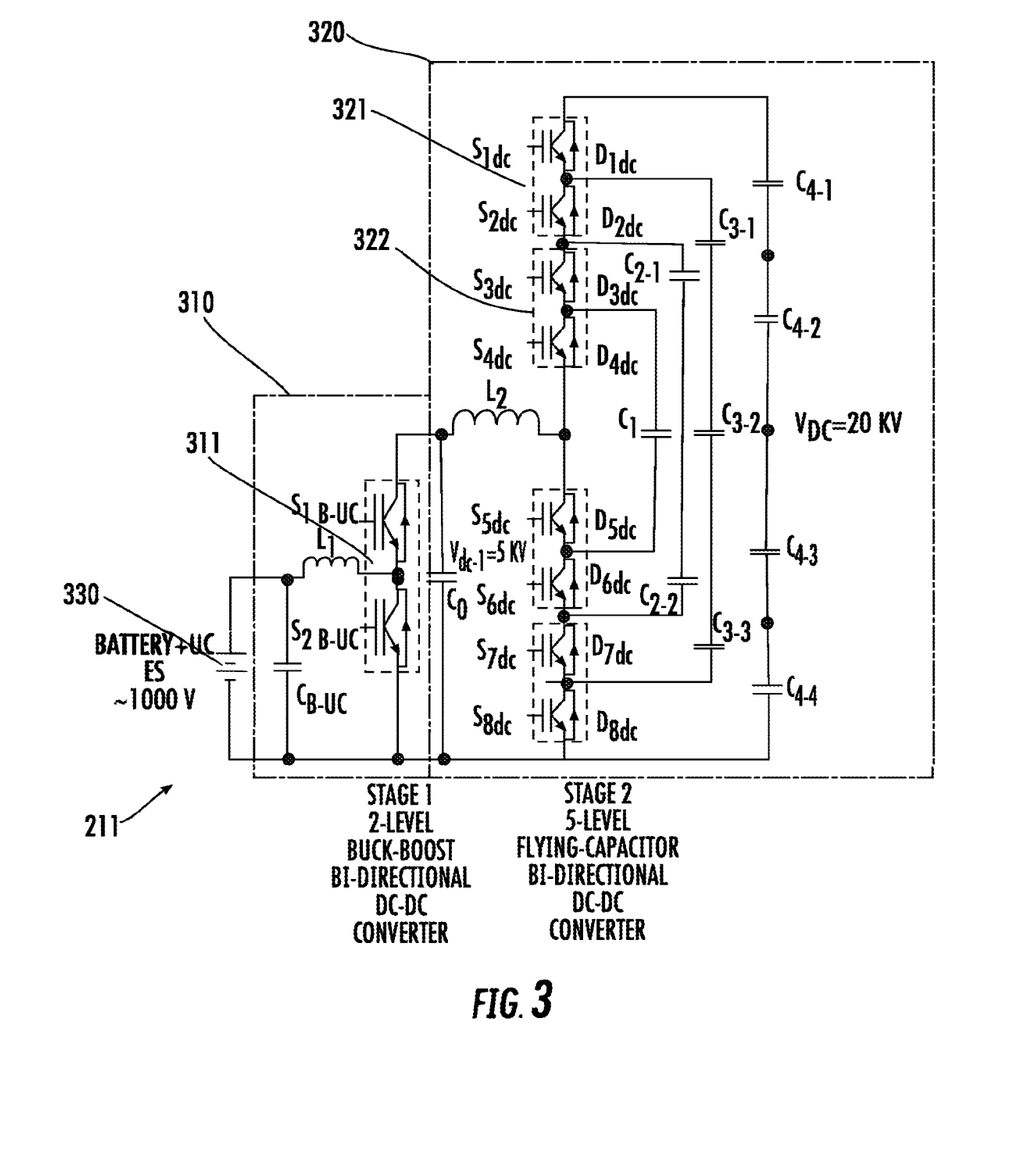
FIG. 3 is a schematic diagram of the two-stage DC-DC bi-directional multi-level converter of FIG. 2.

FIG. 3 illustrates the bi-directional multi-level DC-DC converter section 211 of FIG. 2. The bi-directional multi-level DC-DC converter section 211 includes two DC-DC stages 310, 320, which use low voltage energy storage devices (e.g., about 1000 V DC). Large battery systems 330 are needed (e.g., 5 kV) to generate, for example, a 20 kV DC link voltage if a one stage DC-DC section is used, which, in turn, generates 13.2 kV AC voltage system using a multi-level inverter. To avoid the voltage instability issues associated with large energy storage devices 330, DC-DC converter stages 310 and 320 are utilized to keep the energy storage devices 330 at a lower voltage (e.g., about 1000 V DC). Stage 1 includes a two-level buck-boost bi-directional converter 310 and stage 2 includes a 5-level flying capacitor bi-directional converter 320.

Figure 4:
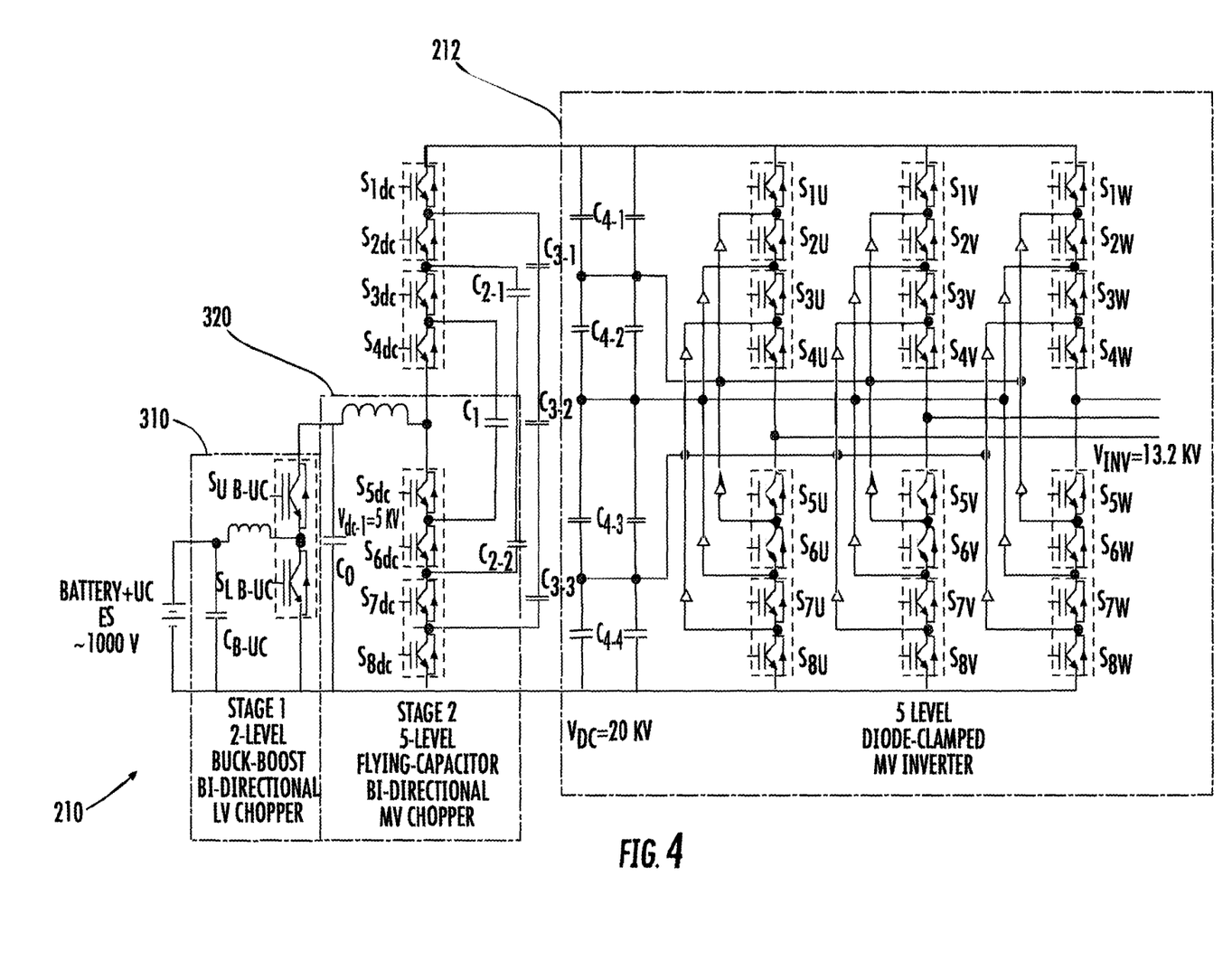
FIG. 4 is a schematic diagram of the DCSTATCOM/MVUPS system with battery and UC energy storage of FIG. 2.

FIG. 4 illustrates a non-isolated power topology for the medium voltage uninterruptible power supply (MVUPS) 210 of FIG. 2. The MVUPS 210 includes the two DC-DC stages 310, 320 of the bi-directional multi-level DC-DC converter section 211 shown in FIG. 3 and the multi-level inverter 212. The embodiment of the multi-level inverter 212 shown in FIG. 4 is a 5-level diode-clamped medium voltage inverter.

Figure 5:
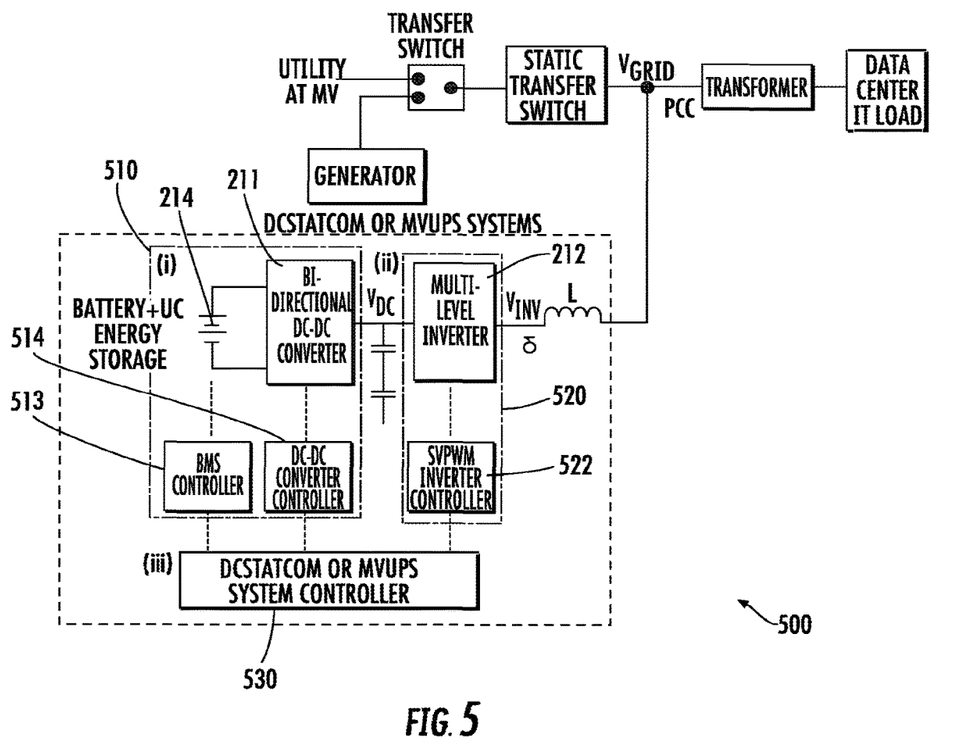
FIG. 5 is a block diagram of a controller including three main sub-system controllers for the DCSTATCOM/MVUPS system.

FIG. 5 is a block diagram of a system 500 illustrating the control architecture of the DCSTATCOM or MVUPS system according to embodiments of this disclosure. The MVUPS system includes three sub-systems that control charge/discharge power flow. The three sub-systems include: (i) battery and ultracapacitor energy storage 214 and bi-directional DC-DC converter 211 and their respective controllers 513, 514 (ii) a multi-level inverter 212 with an SVPWM controller 520, and (iii) a DCSTATCOM or MVUPS system controller 530.

As shown in FIG. 2, there is no magnetic isolation, e.g., a transformer, between the energy storage devices 214 and the utility supply 130. Some data center operators prefer to have magnetic isolation for their low-voltage battery energy storage with respect to the MV utility for safety purposes and to minimize electromagnetic interference (EMI) noise for the BMS controller 513. Though FIG. 1 uses massive low frequency (60 Hz) isolation, its main purpose is to convert low AC voltage to medium AC voltage. The isolation is not mainly for battery isolation and also occupies large space and/or volume. However, space is at a premium for data center applications.

Embodiments of this disclosure feature an insulated gate bipolar transistor (IGBT)-based high frequency (HF) planar transformer (e.g., at a 10 to 15 kHz switching frequency) with a bi-directional DC-DC converter for the low voltage (e.g., about 1000 V DC) energy storage devices utilizing an efficient zero voltage switching (ZVS) controller.

Figure 6:
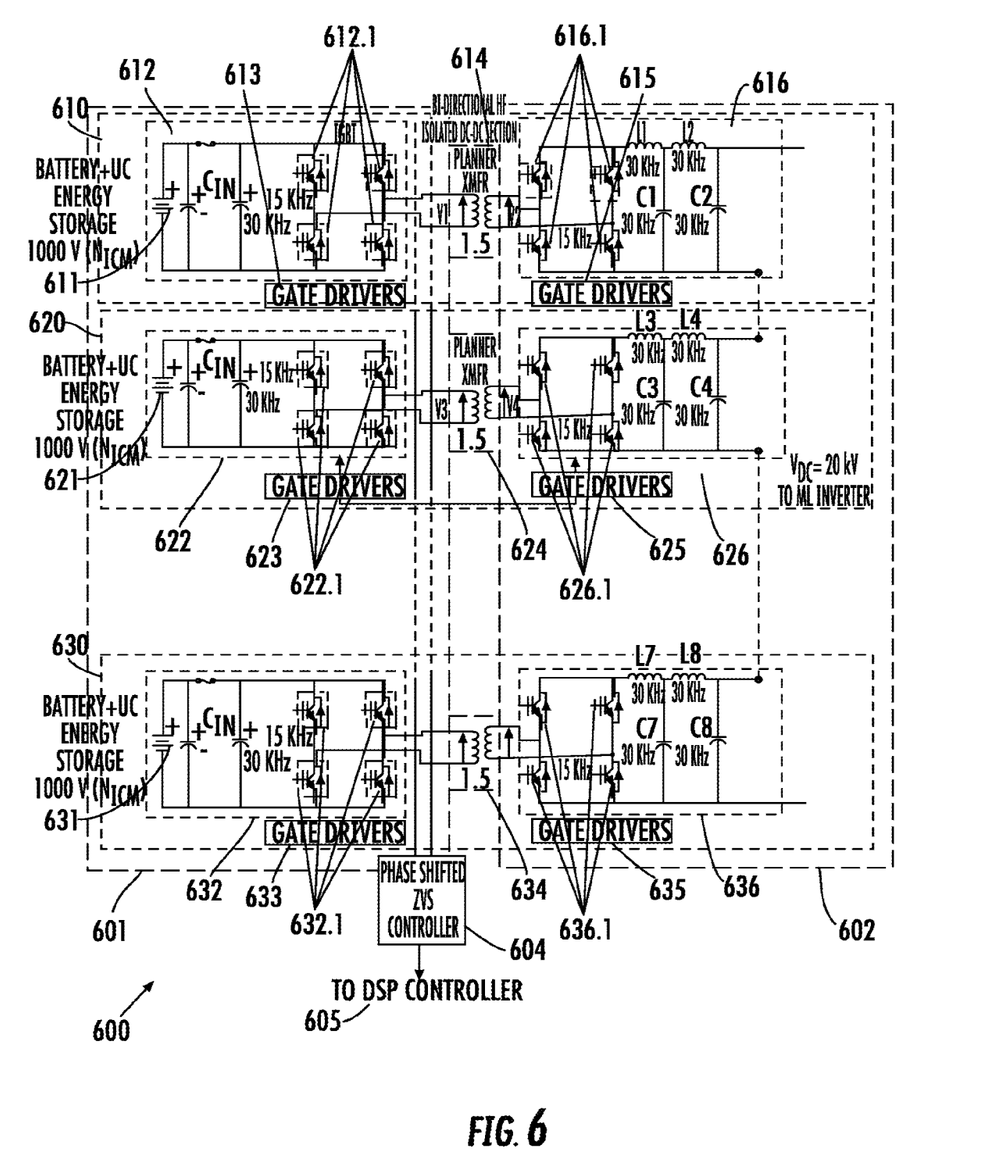
FIG. 6 is a schematic diagram of high frequency (HF) isolated DC-DC bi-directional converters using planar transformers.

FIG. 6 is a circuit block diagram illustrating embodiments of the HF DC-DC converters 600. A HF system (e.g., 10 to 15 kHz) is used to reduce the size and/or volume (e.g., 150 to 250 times smaller in comparison to 60 Hz transformer isolation) of the magnetic isolation and can be incorporated as a part of the DC-DC converter electronics. The HF DC-DC converter 600 is a bi-directional high frequency DC-DC converter and includes multiple H-bridge circuits 612, 616, 622, 626, 632, 636, etc. (on both primary and secondary sides), a plurality of HF planar transformers 614, 624, 634, etc. having primary sides connected in parallel and secondary sides connected in series and dual LC filters coupled to respective second H-bridge circuits 612, 616, 622, 626, 632, 636, etc. The transformers 614, 624, 634, etc. are used to magnetically isolate the energy storage and to avoid interference and to provide safety between the energy storage 611, 621, 631 and medium AC voltage.

The primary sides of the respective HF planar transformers are connected in parallel and the secondary sides of the transformers are connected in series. As shown in FIG. 6, multiple transformers 614, 624, 634, etc. are used. In some embodiments, the transformers 614, 624, 634, etc. may be planar transformers and each of the transformers 614, 624, 634, etc. may have a 1:5 turn ratio. In the case where each of the transformers 614, 624, 634, etc. has a 1:5 turn ratio, the effective turn ratio is 1:20 because the primary-side windings are connected in parallel and the secondary-side windings are connected in series. Thus, in the example of FIG. 6, the transformers 614, 624, 634, etc. step up the voltage, for example, from 1000 V DC on the primary energy storage side 601 to 20 kV DC on the secondary side 602.

As shown in FIG. 6, each primary circuit 612, 622, 632, etc. includes four IGBT devices 612.1, 622.1, 632.1, etc. connected in an H-bridge configuration, and each of the secondary circuits include four IGBT devices connected in an H-bridge configuration. Therefore, there is bi-directional power transfer capability to charge and discharge energy storage devices.

The HF DC-DC converter of FIG. 6 also includes gate drivers 613, 623, 633, etc. for driving the IGBT devices 612.1, 622.1, 632.1, etc. of the first H-bridge circuits of the primary side of the HF transformers and gate drivers 615, 625, 635, etc. for driving the IGBT devices 616.1, 626.1, 636.1, etc. of the second H-bridge circuits 612, 622, 632, etc. of the secondary side of the HF transformers 602. The gate drivers of primary side 613, 623, 633, etc. and the gate drivers of secondary side 615, 625, 635, etc. are controlled by a phase-shifted ZVS controller 604, which is in communication with a system DSP controller 605. The ZVS strategy is used to reduce the switching losses of the IGBT devices 612.1, 622.1, 632.1, etc. and 616.1, 626.1, 636.1, etc.

Depending on the required level of $V_{AC}$ voltage (e.g., 3.3 kV to 13.2 kV), the numbers of HF transformers 614, 624, 634, etc. connected to the primary and secondary sides may vary as illustrated in the following table:

| Battery Voltage (V) | Nos. of HF Transformer in pair (1:5 turn ratio) | Effective primary and secondary turn ratio | DC-link voltage VDC (kV) | Inverter AC output Voltage $V_{AC}$ (kV) |
|---|---|---|---|---|
| 1000 | 1 | 1:5 | 5 | 3.3 |
| 1000 | 2 | 1:10 | 10 | 4.8 |
| 1000 | 2 | 1:10 | 10 | 6.9 |
| 1000 | 4 | 1:20 | 20 | 13.2 |

The soft-switch ZVS controller 604 performs switching only when the voltage is zero. The controller 604 also introduces a phase shift between the primary side 601 of the transformers and the secondary side of the transformers 602. The phase-shifted ZVS controller 604 causes power to flow from the hybrid energy storage system to the DC-link capacitor module of the ML inverter by discharging the battery and in turn supply power to the data center and/or the grid. The gate drivers 613, 623, 633, etc. of the primary IGBT devices 612.1, 622.1, 632.1, etc. and the gate drivers 615, 625, 635, etc. of the secondary IGBT devices 616.1, 626.1, 636.1, etc. are phase shifted by modulating the voltage of the primary side 601 (energy storage side) to lead the voltage of the secondary side 602 (DC-link voltage side) and the energy storage devices are discharged. The phase-shifted ZVS controller 604 causes power to flow from the DC-link voltage to the hybrid energy storage system by charging the energy storage system and in turn supply grid power to the energy storage system. The gate drivers 613, 623, 633, etc. of the primary IGBT devices 613, 623, 633, etc. and the gate drivers 615, 625, 635, etc. of the secondary IGBT devices 615, 625, 635, etc. are phase shifted by modulating the phase so that the voltage of the secondary side 602 (DC-link voltage side) leads the voltage of the primary side 601 (energy storage side) and the battery is charged. The phase-shifted ZVS controller 604 causes no power to flow in between the energy storage and DC-link voltage and vice versa by maintaining a zero phase shift between the voltages of the primary side and the voltage of the secondary side. The phase-shifted ZVS controller 604 and the digital signal processor (DSP) controller 605 may be implemented by, for example, a microprocessor running software, a Field Programmable Gate Array (FPGA), digital logic, a computer executing computer program instructions, or any combination of these devices.

Figure 7:
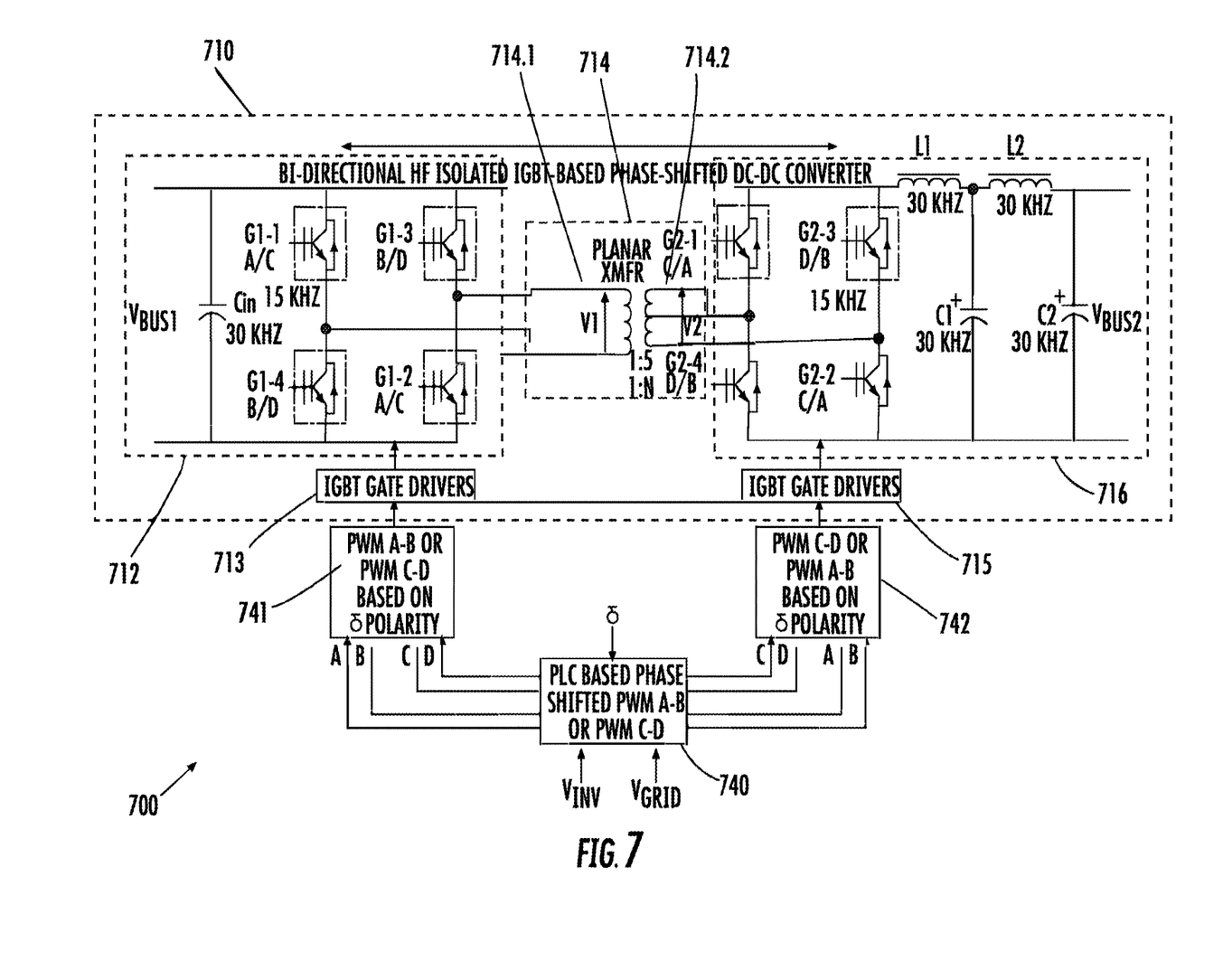
FIG. 7 is a block diagram of an HF bi-directional zero voltage switching (ZVS) controller for dual active full bridge (DAFB) converters to charge/discharge energy storage.

FIG. 7 is a schematic block diagram of the Dual Active Full Bridge (DAFB) converters 700. For control, a closed proportional-integral (PI) control loop may be implemented. The primary AC current is monitored using a Hall-effect current sensor. If the current value crosses the maximum allowed reference current value ($I_{max}$), then the phase shifted PWM control 740 is disabled. The direction of power flow is decided by the external logic command using δ originated from external system controller. The power flow logic based on δ (phase angle between voltage $V_{INV}$ and voltage $V_{GRID}$) is described below.

When δ>0 (i.e., when voltage $V_{INV}$ leads voltage $V_{GRID}$ and power flows from the inverter to the grid with positive δ), then Θ>0 (i.e., voltage V1 leads voltage V2). Therefore, PWM signals A-B 741 (primary energy storage side) is leading PWM signals C-D 742 (secondary side) and battery is discharged. When battery voltage is discharged more than its design limit (using BMS information) then Θ becomes zero in spite of δ>0 to enhance battery life by preventing discharge below the battery's design limit.

When δ<0 (i.e., voltage $V_{GRID}$ leads voltage $V_{INV}$ and power flows from the grid to the inverter with negative δ) then Θ<0 (i.e., voltage V2 leads voltage V1). Therefore, PWM signals A-B 742 (secondary side) are leading PWM signals C-D 741 (primary energy storage side) and the battery is charged. When the battery is charged more than its design limit (using BMS information) then Θ becomes zero in spite of δ<0 to enhance battery life by preventing charging above the battery's design limit.

The principle of the closed-loop controller is based on Power PI ($P_{act}$ and $P_{ref}$) closed control loop with the PWM switching on/off of two (primary side and secondary side) DAFB converters. The PWM waveforms of two DAFB converters 712 and 716 are phase shifted with respect to each other. PWM signals A-B 741 are phase shifted with respect to PWM signals C-D 742 as shown in FIG. 7. The value of phase shift (Θ) angle is determined based on the value of $P_{act}$ and $P_{ref}$ error information. PWM signals 741 or 742 (either A-B or C-D) for a particular DAFB converter 712 or 715 is selected depending on the external δ polarity (positive or negative) input in such a way so as to ensure that power flows in either direction instantaneously. Θ is positive (i.e., voltage V1 (PWM A-B 741) leads voltage V2 (PWM C-D 742) and power flows from energy storage to the DC-link of the multi-level inverter) with positive δ. Similarly, Θ is negative with negative δ. That is, V2 (PWM A-B 741) leads V1 (PWM C-D 742) and power flows from the DC link of the multi-level inverter to enemy storage.

Table 1 below shows the PWM logic when discharging the energy storage, i.e., when power flows from voltage V1 to voltage V2. Table 2 shows the PWM logic when charging the energy storage, i.e., when power flows from voltage V2 to voltage V1.

TABLE 1

DIRECTION OF POWER FLOW: V1 to V2
(Discharging of Energy storage)

| IGBT devices | PWM signals |
|---|---|
| G1-1 | A |
| G1-2 | A |
| G1-3 | B |
| G1-4 | B |
| G2-1 | C |
| G2-2 | C |
| G2-3 | D |
| G2-4 | D |

TABLE 2

DIRECTION OF POWER FLOW: V2 to V1
(Charging of Energy storage)

| IGBT switches | PWM signals |
|---|---|
| G1-1 | C |
| G1-2 | C |
| G1-3 | D |
| G1-4 | D |
| G2-1 | A |
| G2-2 | A |
| G2-3 | B |
| G2-4 | B |

The bi-directional power flow is governed by the following expression assuming the voltage source supplies an AC sinusoidal waveform:

$$P = \left(\frac{V1 * V2}{\omega L}\right) * \sin(\theta); \quad -\pi/2 < \theta < \pi/2 \tag{1}$$

where ω is the frequency in radians/second and θ is the phase shift (power) angle in radians.

From expression (1), active power flows from V1 to V2 when V1 leads V2 by phase Θ, and active power flows from V2 to V1 when V2 leads V1 by phase Θ. The same analysis can be extended to the case of AC square wave voltage sources. Using the waveforms in FIG. 7, the expression for the power flow between V1 and V2 can be expressed as follows:

$$P = \left(\frac{V1 * V2}{\omega L}\right) * \theta * (1 - \theta/\pi) \tag{2}$$

In deriving expression (2), it is assumed that the turn ratio N of the high frequency transformer is set to:

$$N = \frac{Vbus2}{Vbus1} \qquad (3)$$

Figure 8A:
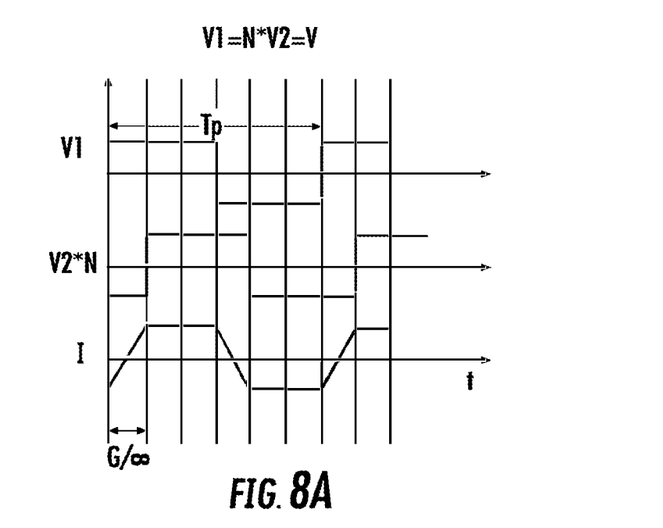
FIG. 8A is a diagram illustrating waveforms at the primary and secondary sides of the transformers.
Figure 8B:
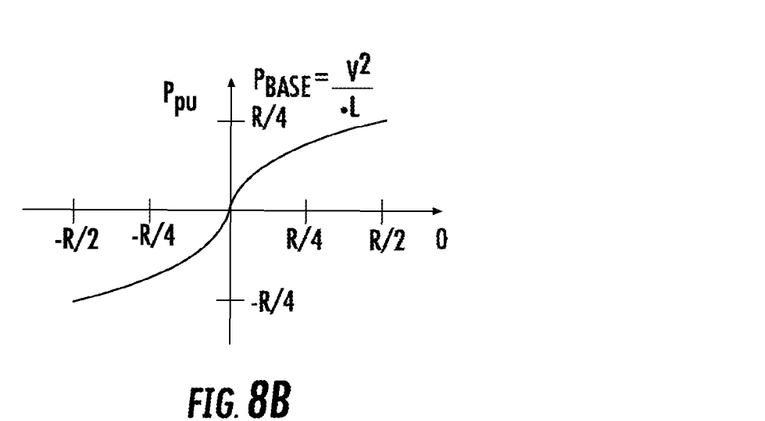
FIG. 8B is a diagram illustrating the power flow through a DAFB converter.

Equation (3) prevents the flow of reactive power from the primary side of the high frequency transformer to the secondary side of the high frequency transformer and vice-versa. The idealized voltage and current waveforms are shown in FIG. 8A. The power flow as a function of the phase shift θ is shown in FIG. 8B.

Figure 9A:
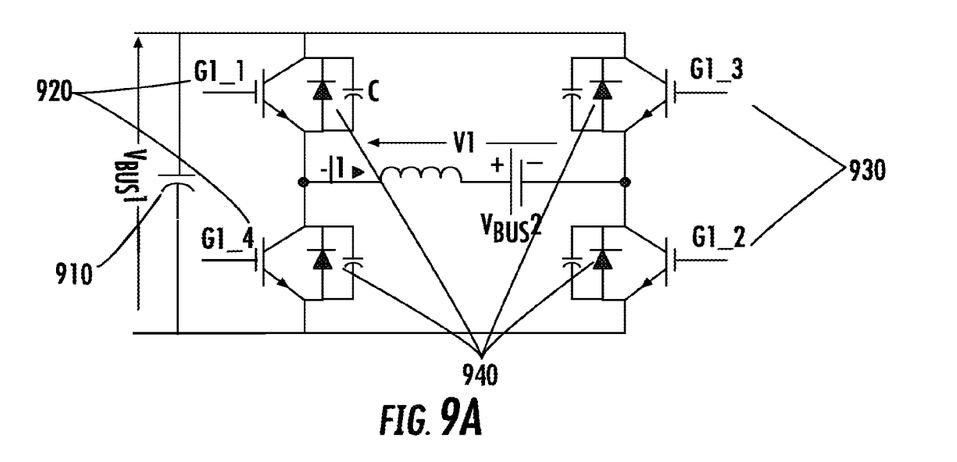
FIG. 9A is a schematic diagram of the primary side of a DAFB converter.
Figure 9B:
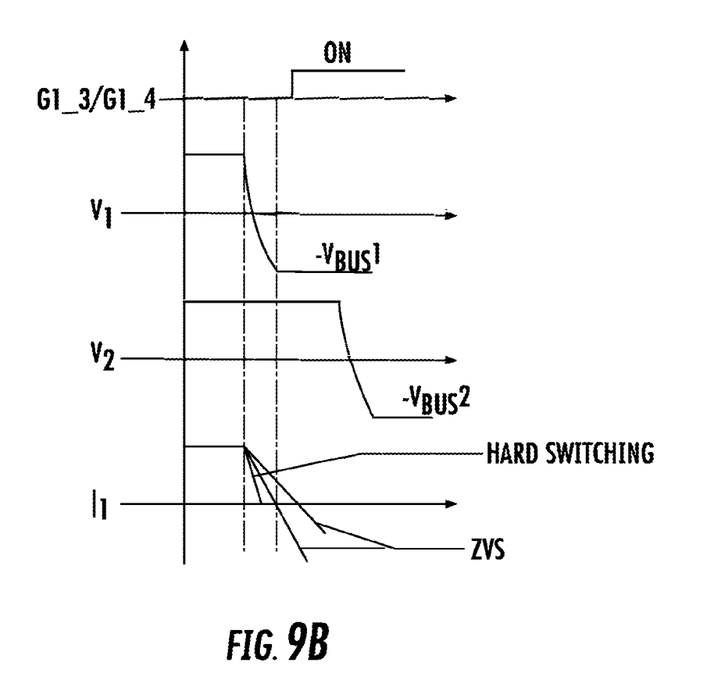
FIG. 9B is a signal diagram illustrating ZVS transition with the DAFB converter.

The transformer's leakage inductance and capacitance across the IGBT devices 612.1, 622.1, 632.1, etc. and 616.1, 626.1, 636.1, etc. are used to achieve ZVS during turn-on. The energy stored in the transformer leakage inductance is made to resonate with the snubber capacitances C 910 across the devices 920 and 930 as shown in FIG. 9A. As a result of this resonant cycle, the voltage across the IGBT devices 920 and 930 to be turned ON is brought down to zero. Inductive energy is regenerated back to Vbus1 through anti parallel diodes 940. While at zero or very close to zero voltage, IGBT devices 920 and 930 are turned ON, which achieves zero voltage switching (ZVS). FIG. 9B shows the turn-on transients of the switching pair G1-3/G1-4. Achieving ZVS operation is difficult when DC voltages are not equal as shown in expression (3), resulting in more snubber losses as operation moves from full ZVS to partial ZVS to hard switching mode.

Turn-off losses are also reduced significantly by using snubbing capacitor C across each device. It is estimated that 60-90% of the switching losses are eliminated with ZVS when properly employing the techniques described above.

Figure 10:
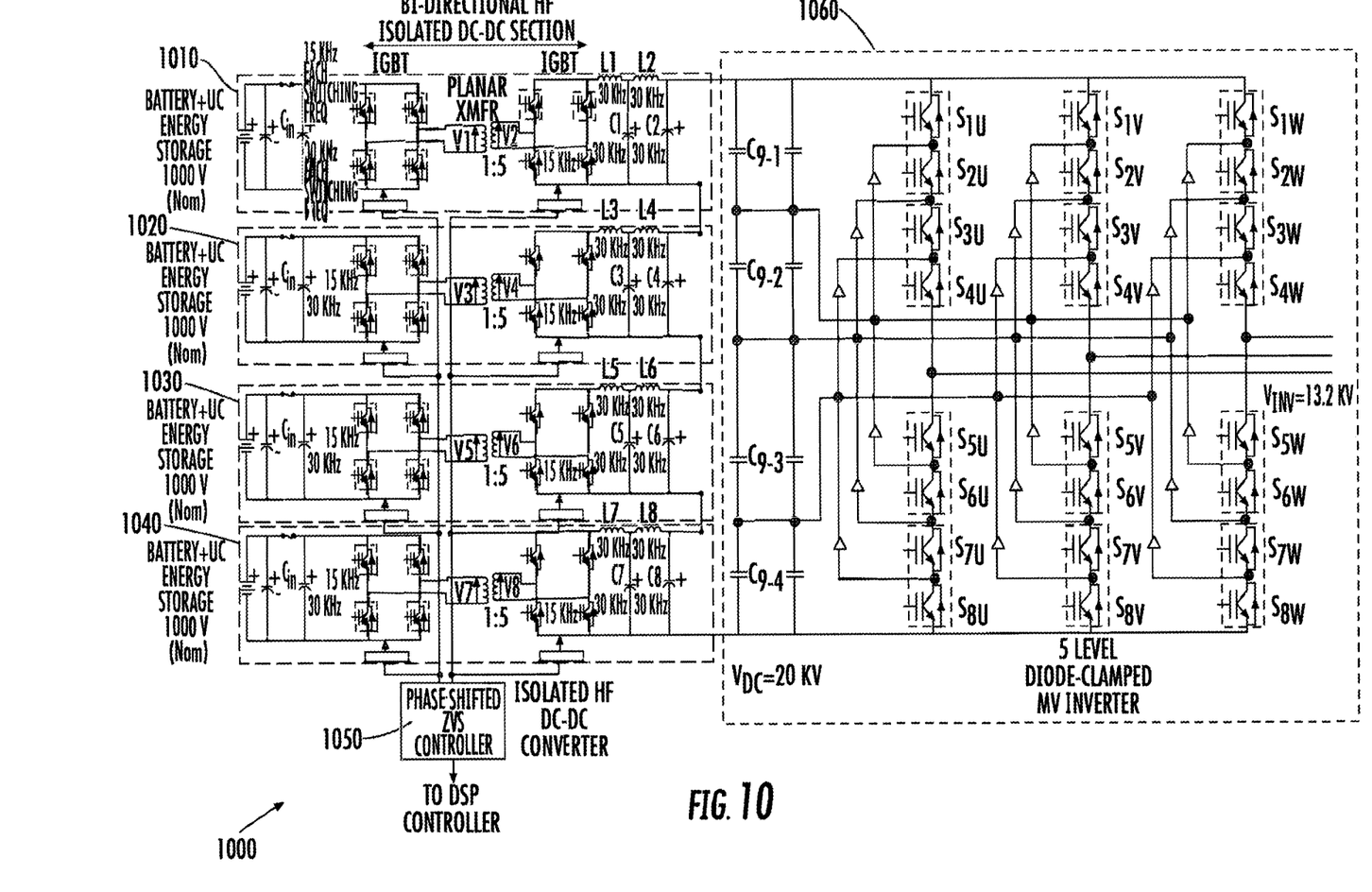
FIG. 10 is a schematic diagram of an HF multi-level DCSTATCOM/MVUPS system with battery and ultracapacitor energy storage.

FIG. 10 is a diagram illustrating a HF isolated multi-level DCSTATCOM/MVUPS system with battery and UC energy storage 1000.

Figure 11:
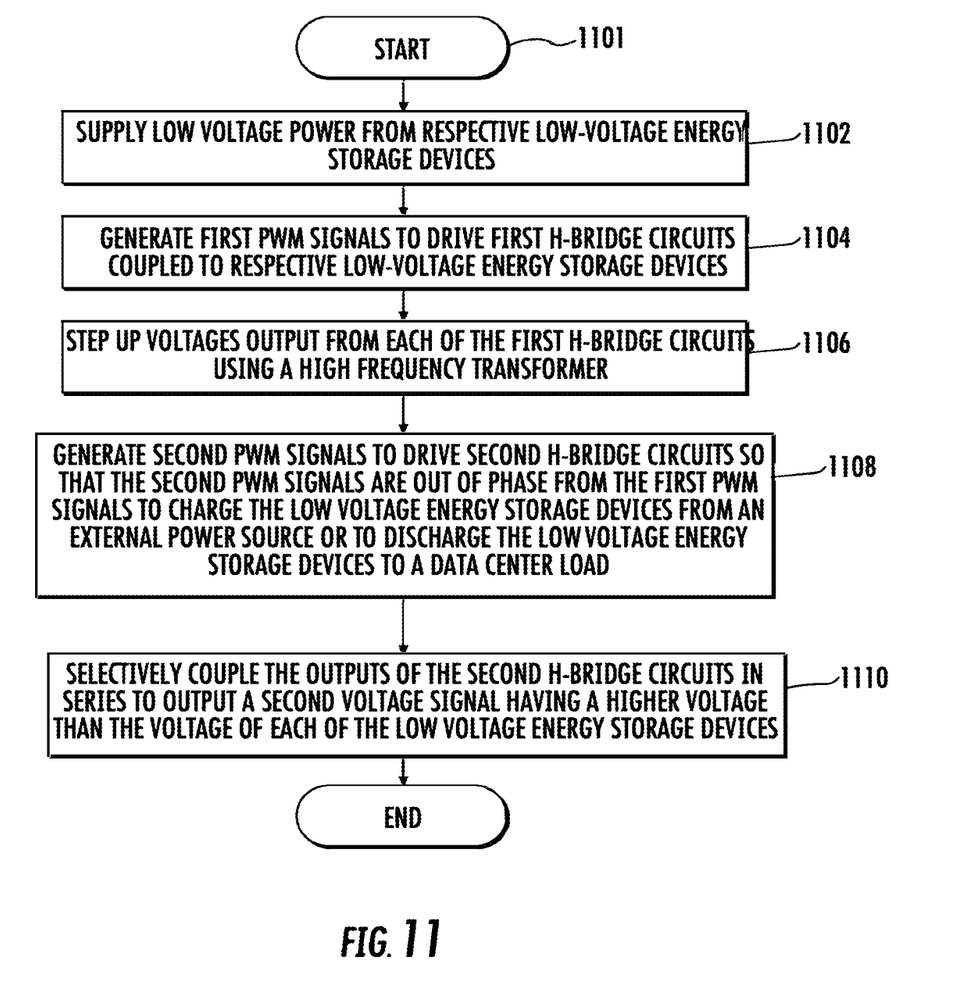
FIG. 11 is a flow diagram of a method of charging or discharging an energy storage device.

FIG. 11 is a flow diagram of a method according to embodiments of this disclosure. After starting in block 1101, low voltage power signals are supplied from respective low voltage energy storage devices in block 1102. In block 1104, first PWM signals are generated to drive first H-bridge circuits coupled to respective low voltage energy storage devices. The first PWM signals may have a fixed frequency and a 50% duty ratio. In block 1106, voltages output from each of the first H-bridge circuits are stepped up using a high frequency transformer. In block 1108, second PWM signals are generated to drive second H-bridge circuits so that the second PWM signals are out of phase from the first PWM signals to charge the low voltage energy storage devices from an external power source or to discharge the low voltage energy storage devices to a data center load. The second PWM signals may have a fixed frequency and a 50% duty ratio. In block 1110, the outputs of the second H-bridge circuits are selectively coupled in series to output a second voltage signal having a higher voltage than the voltage of each of the low voltage energy storage devices.

From the foregoing and with reference to the various figures, those skilled in the art will appreciate that certain modifications can also be made to this disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A power source comprising:
   DC-DC converter circuits coupled together, each DC-DC converter circuit including:
   an energy storage system;
   a first switching circuit coupled to the energy storage system;
   a transformer, a primary side of the transformer being coupled to the first switching circuit; and
   a second switching circuit coupled to a secondary side of the transformer; and
   a phase-shifted zero-voltage switching (ZVS) controller configured to generate a first control signal to control the first switching circuit and generate a second control signal to control the second switching circuit differently than the first switching circuit.

2. The power source of claim 1, wherein the phase-shifted ZVS controller is configured to control the first and second switching circuits to charge or discharge the energy storage system.

3. The power source of claim 1, wherein the phase-shifted ZVS controller is a programmable logic controller that generates phase-shifted fixed-frequency ON-OFF switching signals.

4. The power source of claim 1, wherein the first and second switching circuits include insulated-gate bipolar transistors (IGBTs) or metal-oxide-semiconductor field-effect transistors (MOSFETs).

5. The power source of claim 4, further comprising snubbing capacitors electrically coupled to the IGBTs, respectively.

6. The power source of claim 1, wherein the transformer is a planar transformer.

7. The power source of claim 1, wherein the first switching circuit, the second switching circuit, and the transformer are combined into a modular circuit.

8. The power source of claim 1, wherein the energy storage system includes a battery and an ultracapacitor.

9. The power source of claim 8, wherein the battery is a lead-acid battery or a lithium-ion battery.

10. An uninterruptible power supply comprising:
    DC-DC converters coupled together in series, each DC-DC converter comprising:
    a battery;
    an ultracapacitor coupled to the battery;
    a first switching circuit coupled to the ultracapacitor;
    a transformer coupled to the first switching circuit; and
    a second switching circuit coupled to the transformer;
    a phase-shifted zero-voltage switching (ZVS) controller configured to: (a) generate first control signals to control the first switching circuits and (b) generate second control signals to control the second switching circuits differently than the first switching circuits; and
    a multi-level (ML) inverter electrically coupled across the DC-DC converters.

11. The uninterruptible power supply of claim 10, further comprising a space vector pulse width modulation (SVPWM) controller configured to control the ML inverter.

12. The uninterruptible power supply of claim 10, wherein the transformer is a planar transformer.

13. The uninterruptible power supply of claim 10, wherein the battery is a lead-acid battery or a lithium-ion battery.

14. The uninterruptible power supply of claim 10, further comprising a battery management system (BMS) controller coupled to the battery.

15. A method comprising:
generating first control signals to drive first switching circuits coupled to energy storage systems, respectively;
stepping up voltages output from each of the first switching circuits coupled to the first switching circuits through high frequency transformers, respectively; and
generating second control signals to drive second switching circuits differently than the first switching circuits, respectively, wherein the second control signals are out of phase from the first control signals to charge the energy storage systems from an external power source or to discharge the energy storage systems to a load.

16. The method of claim 15, further comprising selectively coupling outputs of the second switching circuits in series to output a voltage greater than the voltage of each of the energy storage systems.

17. The method of claim 15, further comprising supplying power from the energy storage systems to the first switching circuits, respectively.

18. The power source of claim 1, wherein the first switching circuit and the second switching circuit are dual active full bridge (DAFB) converters.

19. The power source of claim 1, wherein the phase-shifted zero-voltage switching (ZVS) controller executes a closed proportional-integral (PI) control loop.

20. The uninterruptible power supply of claim 10, wherein primary sides of the transformers are coupled in parallel, and the secondary sides of the transformers are coupled in series.

* * * * *